United States Patent
Le Ven et al.

(10) Patent No.: US 10,518,200 B2
(45) Date of Patent: ***Dec. 31, 2019

(54) NO FILTER NO RUN FLUID FILTRATION SYSTEM

(71) Applicant: Cummins Filtration IP, Inc., Columbus, IN (US)

(72) Inventors: Arnaud Le Ven, Ergue Gaberic (FR); Gerard Malgorn, Quimper (FR); Thierry Couvin, Guidel (FR); Ajay Joshi, Pune (IN)

(73) Assignee: Cummins Filtration IP, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,632

(22) Filed: Jan. 8, 2018

(65) Prior Publication Data

US 2018/0133627 A1    May 17, 2018

Related U.S. Application Data

(63) Continuation of application No. 14/227,651, filed on Mar. 27, 2014, now Pat. No. 9,901,851.

(51) Int. Cl.
| | | |
|---|---|---|
| *B01D 35/153* | (2006.01) | |
| *B01D 29/90* | (2006.01) | |
| *F02M 37/22* | (2019.01) | |
| *B01D 35/157* | (2006.01) | |
| *B01D 29/21* | (2006.01) | |

(52) U.S. Cl.
CPC ............. *B01D 29/90* (2013.01); *B01D 29/21* (2013.01); *B01D 35/1573* (2013.01); *F02M 37/22* (2013.01); *B01D 2201/4053* (2013.01)

(58) Field of Classification Search
CPC .... B01D 29/90; B01D 35/1573; B01D 29/21; B01D 2201/4053; F02M 37/22
See application file for complete search history.

(56) References Cited

U.S. PATENT DOCUMENTS

| | | |
|---|---|---|
| 3,363,762 A | 1/1968 | Ensign |
| 4,303,514 A | 12/1981 | Theorell |
| 4,687,023 A | 8/1987 | Harbison et al. |
| 5,049,269 A | 9/1991 | Shah |
| 5,215,655 A | 6/1993 | Mittermaier |
| 5,362,390 A | 11/1994 | Widenhoefer et al. |
| 5,846,417 A | 12/1998 | Jiang et al. |
| 5,855,780 A | 1/1999 | Dye et al. |
| 6,053,334 A | 4/2000 | Popoff et al. |

(Continued)

OTHER PUBLICATIONS

International Search Report and Written Opinion issued for PCT/US2008/067643, dated Jan. 5, 2009, 8 pages.

*Primary Examiner* — Thomas M Lithgow
(74) *Attorney, Agent, or Firm* — Foley & Lardner LLP

(57) ABSTRACT

A filter system including a designated filter cartridge including a geometric projection therein and a filter cartridge housing. The filter cartridge housing including a valve that controls fluid flow out of the filter system, a filter cartridge housing, and a filter cartridge housing cover. The valve may include an opening keyed to the geometric projection such that the geometric projection engages the opening and actuates the valve, and the valve may be configured to attach to the filter cartridge housing cover by a snap fit connection.

20 Claims, 16 Drawing Sheets

(56) References Cited

U.S. PATENT DOCUMENTS

| | | | |
|---|---|---|---|
| 6,113,781 A | 9/2000 | Popoff et al. | |
| 6,495,042 B1 | 12/2002 | Knight | |
| 6,554,139 B1 | 4/2003 | Maxwell et al. | |
| 6,884,349 B1 | 4/2005 | Jiang | |
| 6,902,669 B2 | 6/2005 | Jiang | |
| 9,901,851 B2 * | 2/2018 | Le Ven | B01D 29/90 |
| 2004/0069700 A1 | 4/2004 | Miller et al. | |
| 2006/0000754 A1 | 1/2006 | Kang et al. | |
| 2009/0065447 A1 | 3/2009 | Forrest et al. | |
| 2009/0134087 A1 | 5/2009 | Hawkins et al. | |
| 2011/0024344 A1 | 2/2011 | Thomas et al. | |
| 2011/0259808 A1 | 10/2011 | Oelschlaegel | |
| 2014/0124459 A1 | 5/2014 | Li et al. | |

\* cited by examiner

NO FILTER NO RUN FLUID FILTRATION SYSTEM

CROSS-REFERENCE TO RELATED APPLICATIONS

The present application is a continuation of U.S. patent application Ser. No. 14/227,651, filed Mar. 27, 2014, the contents which is hereby incorporated by reference in its entirety and for all purposes.

TECHNICAL FIELD

The present application relates to a fluid filtration system.

BACKGROUND

In many applications, it is desirable to have a fuel filtration system in which the flow of fuel to an engine is prevented if no filter cartridge is installed of if an incorrect filter cartridge is installed. The operation of an engine with no filter cartridge installed or with an incorrect filter cartridge installed may result in a degradation of engine performance or permanent damage to the engine.

SUMMARY

Various embodiments relate to a fluid filter system comprising a designated filter cartridge including a geometric projection therein and a filter cartridge housing including flow restriction valve. The geometric projection may engage the flow restriction valve when the designated filter element is installed in the filter element housing, allowing the flow of the fluid through the fluid filter system.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Various exemplary embodiments relate to a fluid filtration system, for example a fuel filter system, that incorporates a filter cartridge and a filter cartridge housing a flow restriction valve for the purpose of preventing fluid flow through the system in the absence of a filter cartridge or where an incorrect filter cartridge is installed in the filter cartridge housing. The fluid filter system may be employed in any appropriate vehicle or engine application. According to one embodiment, the fluid filter system may be employed in a diesel engine application.

According to an exemplary embodiment, the fluid filtration system is a "no filter, no run" system. A "no filter, no run" filter system is a system designed such that fluid flow through the system is prevented altogether or permitted in an amount insufficient to allow engine operation when no filter cartridge or an incorrect filter cartridge is installed in the system. In one embodiment, the filter system may be configured to allow some fluid to pass through the flow restriction valve even when no filter cartridge or an incorrect filter cartridge is installed. The filter system may be configured to allow sufficient fluid to pass through the flow restriction valve to lubricate elements downstream from the filter system and prevent damage thereto but not allow engine operation.

According to an exemplary embodiment, the filter cartridge includes geometrical features that correspond to features of a filter cartridge housing. For example, the filter cartridge may include a geometric projection that corresponds to an opening of a flow restriction valve provided in the filter cartridge housing, preventing fluid flow out of the filter housing in the absence of a filter cartridge with the appropriate geometric projection. In one embodiment, the opening may be a circular opening. The system may prevent the flow of fluid out of the filter housing when an incorrect filter is installed in the filter housing or when no filter cartridge is installed in the filter housing. Additionally, the geometric projection may ensure that the desired seal interface between the filter cartridge and the flow restriction valve is achieved. The flow restriction valve, according to an exemplary embodiment, exhibits improved reliability and a reduced pressure drop during filtration.

According to an exemplary embodiment, a geometric projection of the filter cartridge may engage with an opening in a flow restriction valve of the filter housing. The flow restriction valve may include a valve ball disposed within a chamber. The ball and valve may be configured such that the ball is movable in to a blocking position when fluid pressure is applied to the valve ball. The filter cartridge may include a geometric projection that acts as a blocking means that prevents the valve ball from moving to the blocking position when a fluid pressure is applied.

Figure 1:
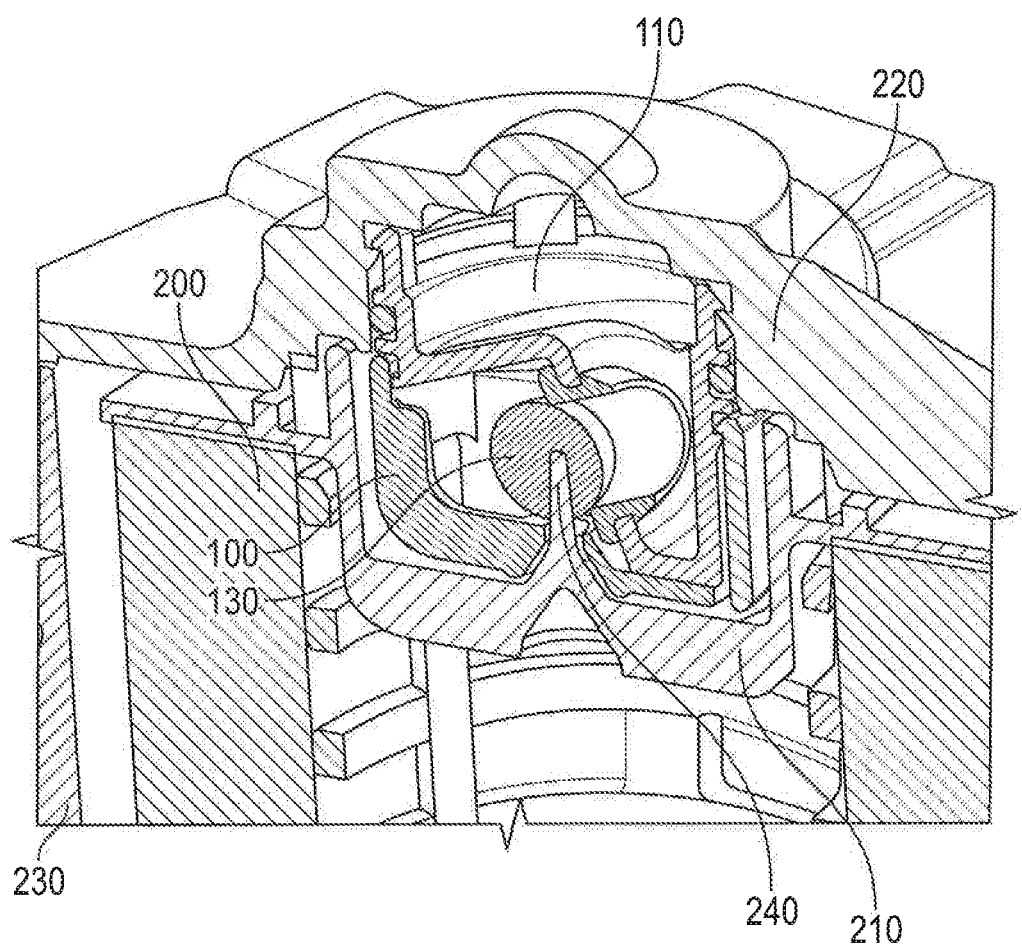
FIG. 1 is a cross-section view of a correct filter cartridge installed in a filter cartridge housing according to one embodiment.

As illustrated in FIG. 1, a filter cartridge 200 may be placed in a filter housing 230 that includes a filter housing cover 220. A geometric projection 240 of the filter cartridge end plate 210 may engage an opening of a flow restriction valve attached to the filter housing cover 220. The geometric projection may have any appropriate shape. In one embodiment, the geometric projection 240 is in the form of a pin that extends along the longitudinal axis of the filter cartridge. The geometric projection 240 may extend from the center of the end plate 210.

According to an exemplary embodiment, the filter cartridge 200 may be any suitable filter design. In one embodiment, the filter cartridge may be a single filter design. In another embodiment, the filter cartridge may be a double flow filter design. The filter cartridge may be cylindrical. The filter cartridge may include an end plate 210 and filter media. In one embodiment, the end plate 210 may be configured to accommodate a flow restriction valve.

According to an exemplary embodiment, the flow restriction valve includes a valve body 100, a valve support 110, and a valve ball 130 that is configured to restrict fluid flow through the valve when no filter cartridge 200 or an incorrect filter cartridge is installed in the filter housing 230. The geometric projection 240 engages the opening of the valve such that the ball is prevented from blocking the flow of fluid when a designated filter cartridge is installed in the filter housing. FIG. 1 depicts the geometric projection 240 of a designated filter cartridge overlaid on the position of the ball 130 when restricting fluid flow through the valve, showing that the geometric projection 240 physically prevents the ball 130 from restricting fluid flow out of the filter system when a designated filter cartridge is present.

According to an exemplary embodiment, the area between the filter cartridge 200 and the filter housing 230 defines an unfiltered fluid side of the filter system. The interior of the filter cartridge 200 may define a filtered fluid side of the filter system.

As illustrated in FIGS. 2-21, the flow restriction valve includes a valve body 100, valve support 110, valve ball 130, and valve gasket 120, according to an exemplary embodiment. The valve body includes an opening 160 keyed to the geometric projection of the designated filter cartridge. The valve support 110 may be provided with a sealing element 170 to provide a fluid seal between the valve support and the filter housing cover to which it is attached. The sealing element 170 may comprise an o-ring. The sealing element, in conjunction with the flow restriction valve, may be configured to separate the unfiltered fluid from the filtered fluid within the filter housing and filter housing cover.

The valve support may include projections 150 configured to engage the filter housing cover. The projections 150 may be provided with an enlarged end such that the projections engage the filter housing cover and attach the valve support 110 to the filter housing cover. The projections 150 may have any appropriate geometry. The projections 150 may be fingers or tabs. The projections 150 may include an enlarged end such that the projections snap fit over a corresponding feature of the filter housing cover. The snap fit connection allows the adaptation of the flow restriction valve to a variety of filter systems and the retrofit of existing filter cover housings.

Figure 3:
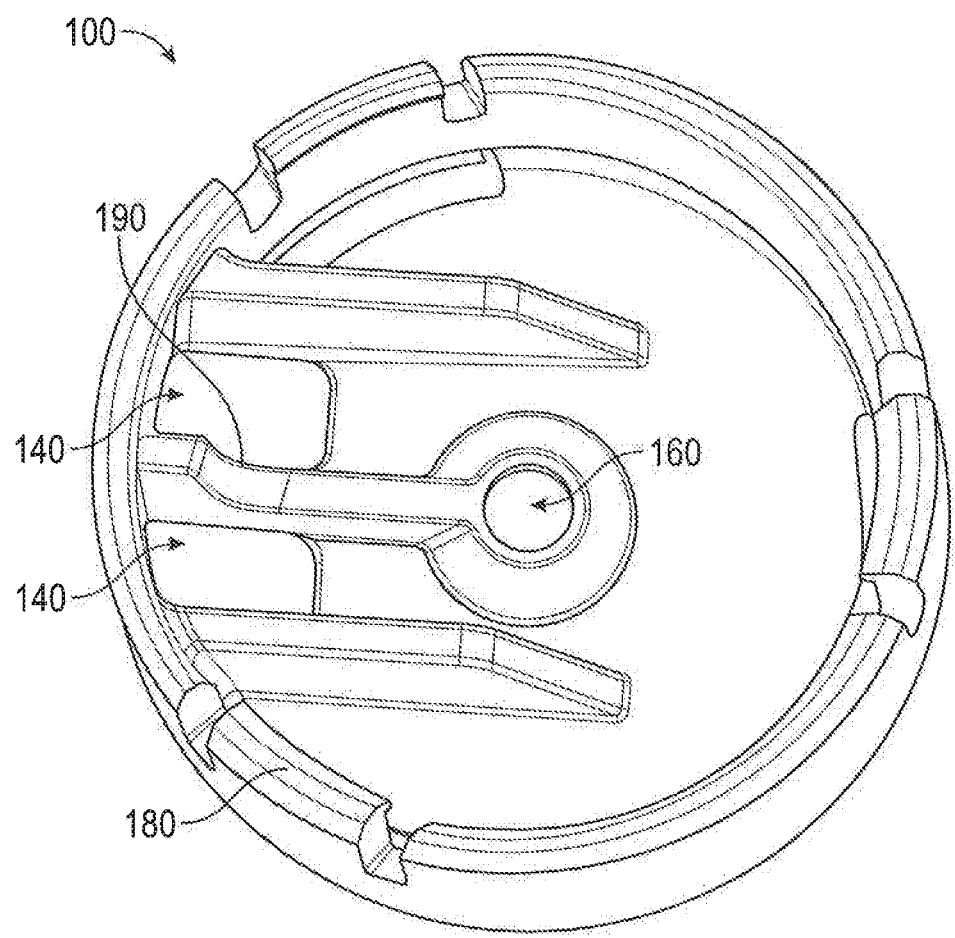
FIG. 3 is a perspective view of a flow restriction valve body according to one embodiment.
Figure 4:
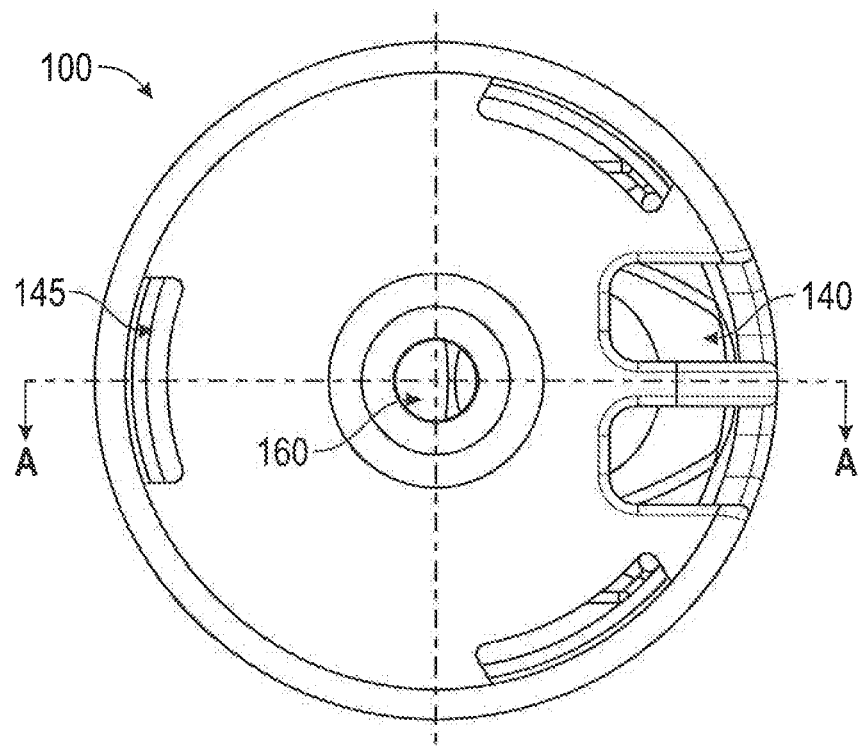
FIG. 4 is a bottom view of a flow restriction valve according to one embodiment.
Figure 6:
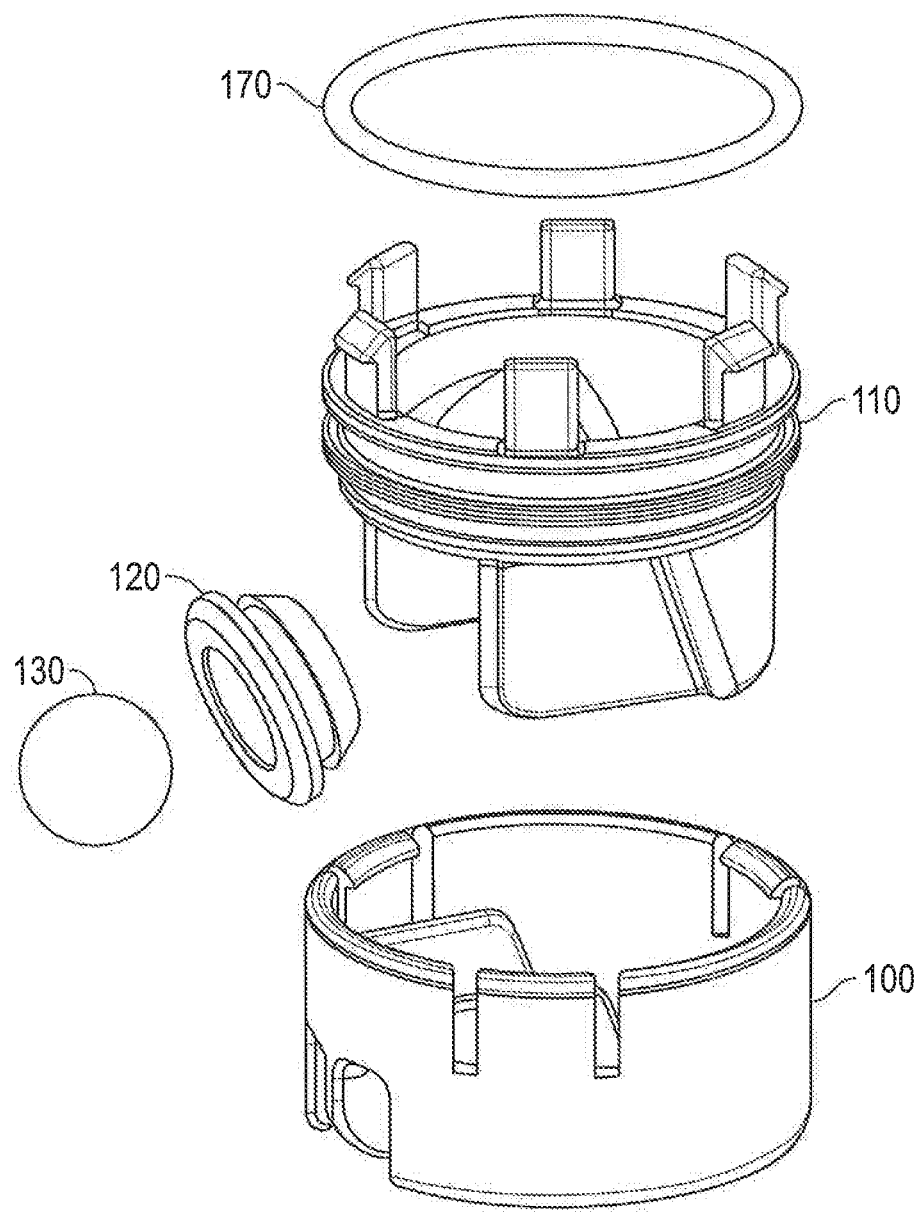
FIG. 6 is an exploded view of a flow restriction valve according to one embodiment.

The valve body 100 includes fluid flow openings 140 and opening 160 keyed to engage geometric projection of the filter cartridge. The valve body 100 may include one or more enlarged projections 180. The enlarged projections 180 may be configured such that the enlarged projections 180 engage the valve support and attach the valve body 100 to the valve support. The enlarged projections 180 may be separated from the remaining valve body wall by voids or cut-outs to form a tab with an enlarged end. Any number of enlarged projections 180 may be provided on the valve body. As shown in FIGS. 3 and 6, three enlarged projections 180 may be provided on the valve body. The enlarged projections 180 may be configured to snap fit over a corresponding feature of the valve support.

Figure 7:
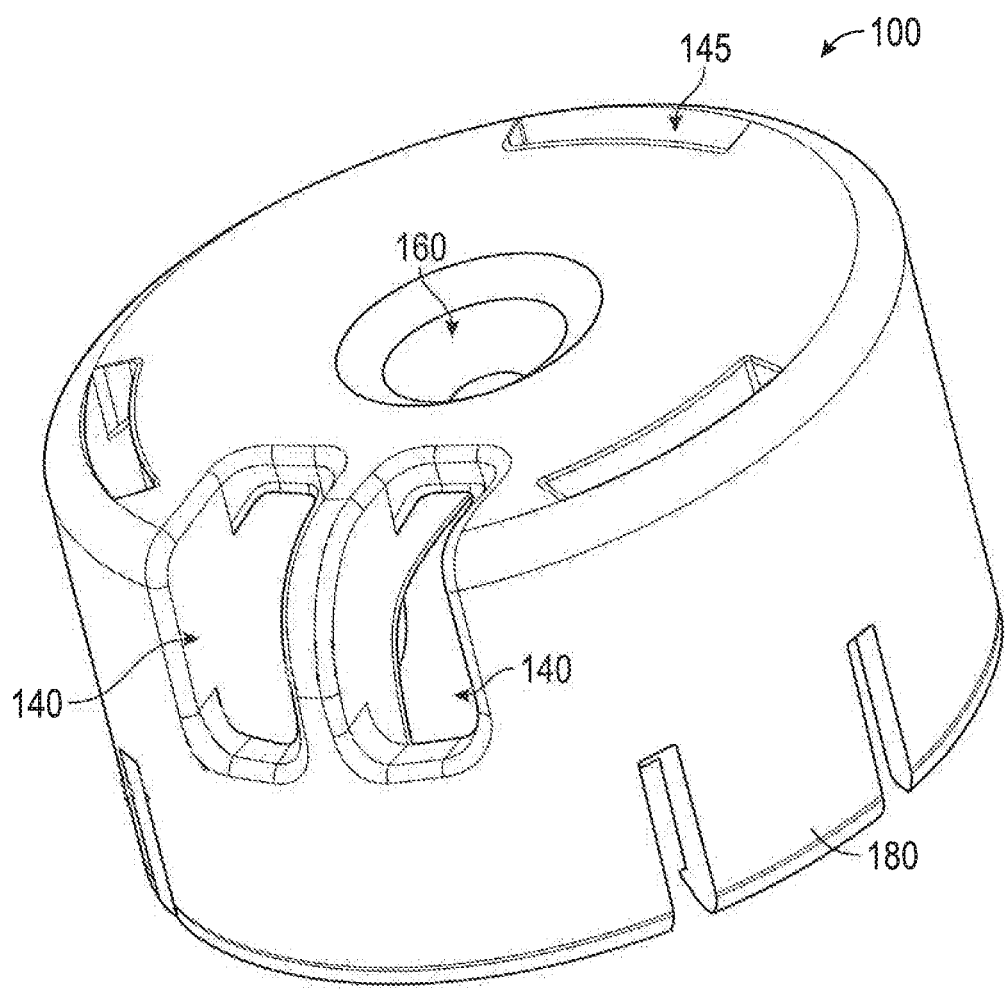
FIG. 7 is a perspective view of a flow restriction valve body according to one embodiment.
Figure 8:
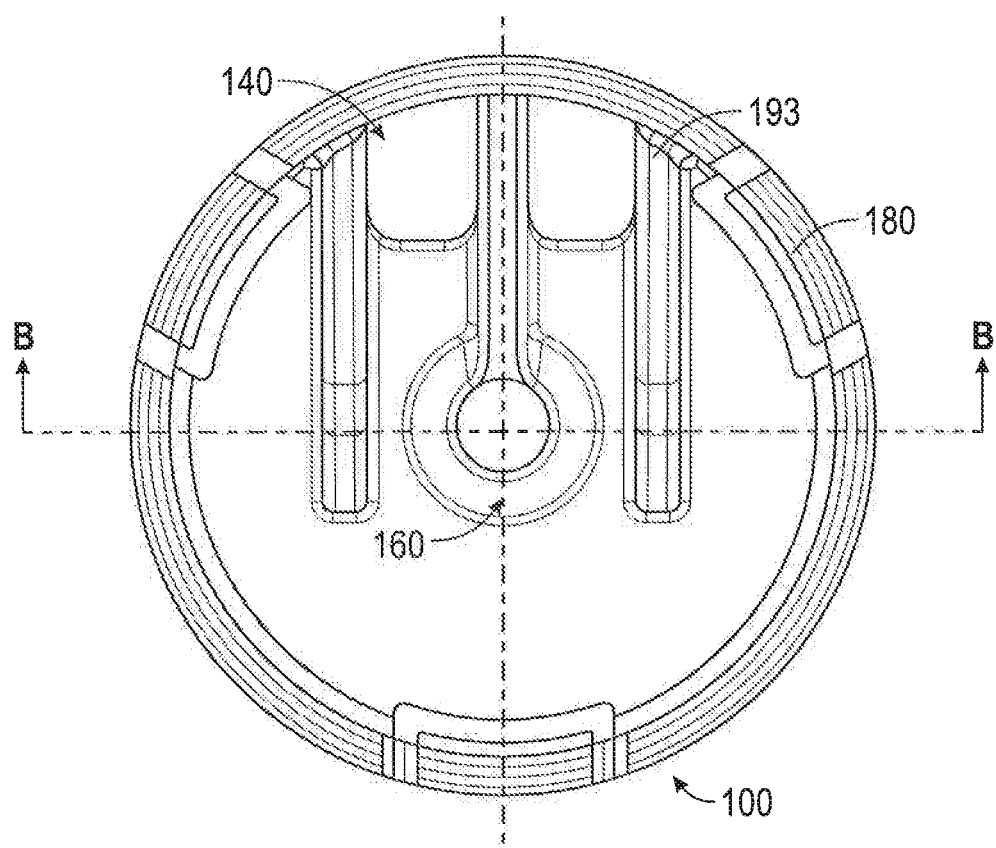
FIG. 8 is a top view of a flow restriction valve body according to one embodiment.
Figure 11:
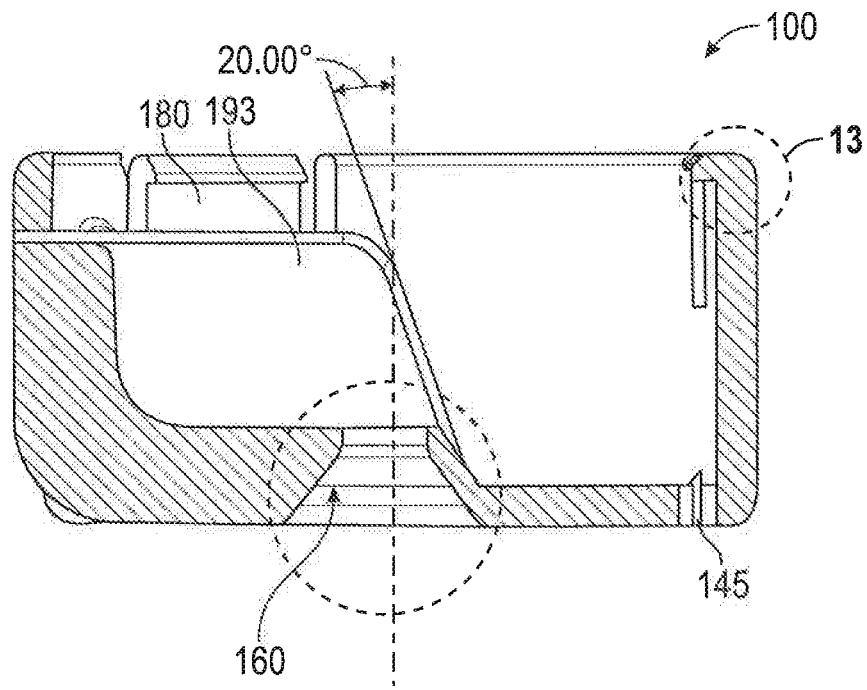
FIG. 11 is cross-section view of the flow restriction valve body of FIG. 10 along line A-A.
Figure 12:
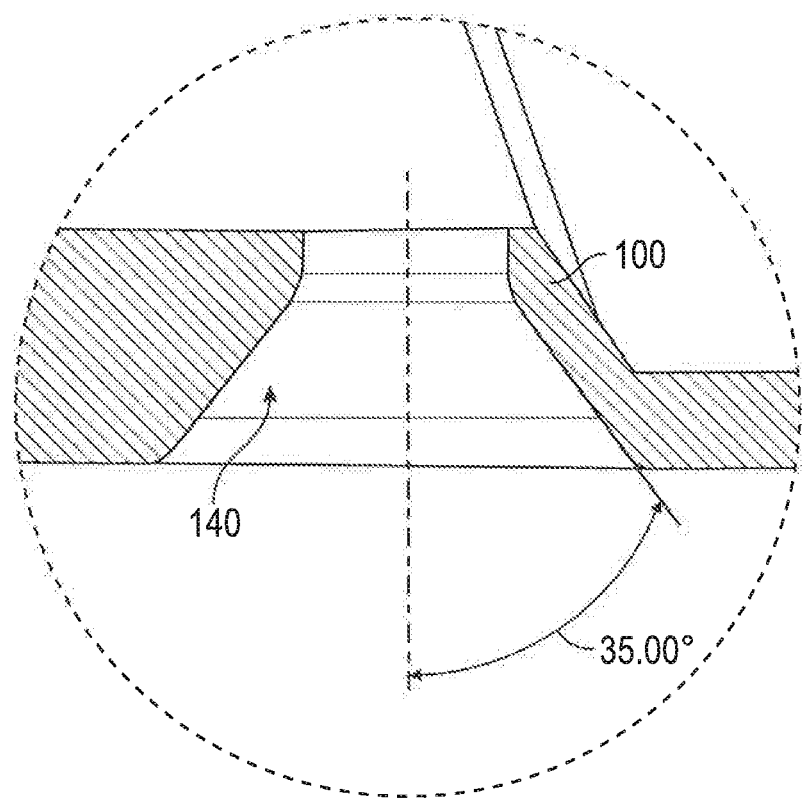
FIG. 12 is detailed view of a portion of the flow restriction valve body of FIG. 10.
Figure 13:
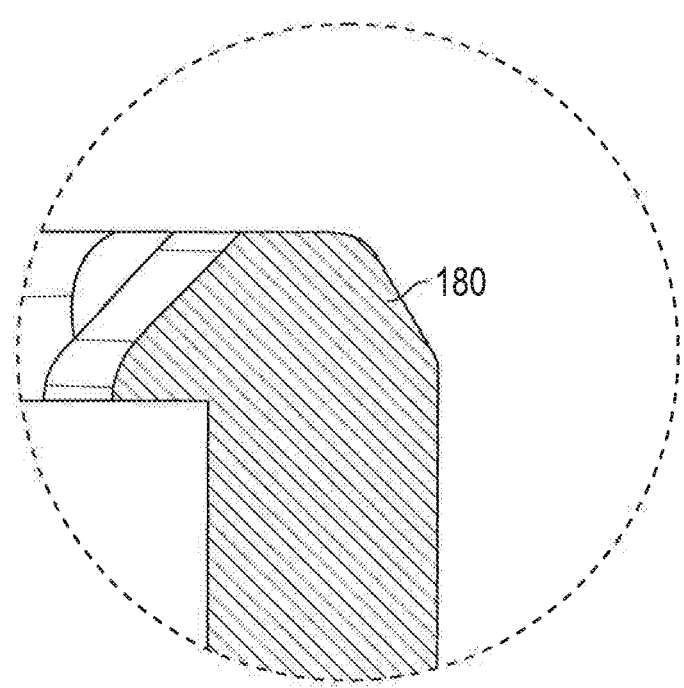
FIG. 13 is detailed view of a portion of the flow restriction valve body of FIG. 10.

As shown in FIGS. 7 and 11, the valve body 100 may include bypass openings 145. Any suitable number of bypass openings 145 may be provided in the valve body. In one embodiment three bypass openings 145 are evenly spaced around the perimeter of the valve body 100. The bypass openings 145 may be configured to allow some fluid to pass through the flow restriction valve even when no filter cartridge or an incorrect filter cartridge is installed. The bypass openings 145 may be configured to allow sufficient fluid to pass through the flow restriction valve to lubricate elements downstream from the filter system and prevent damage thereto. In one embodiment, the bypass openings 145 do not allow sufficient fuel flow out of the filter system for engine operation.

Figure 5:
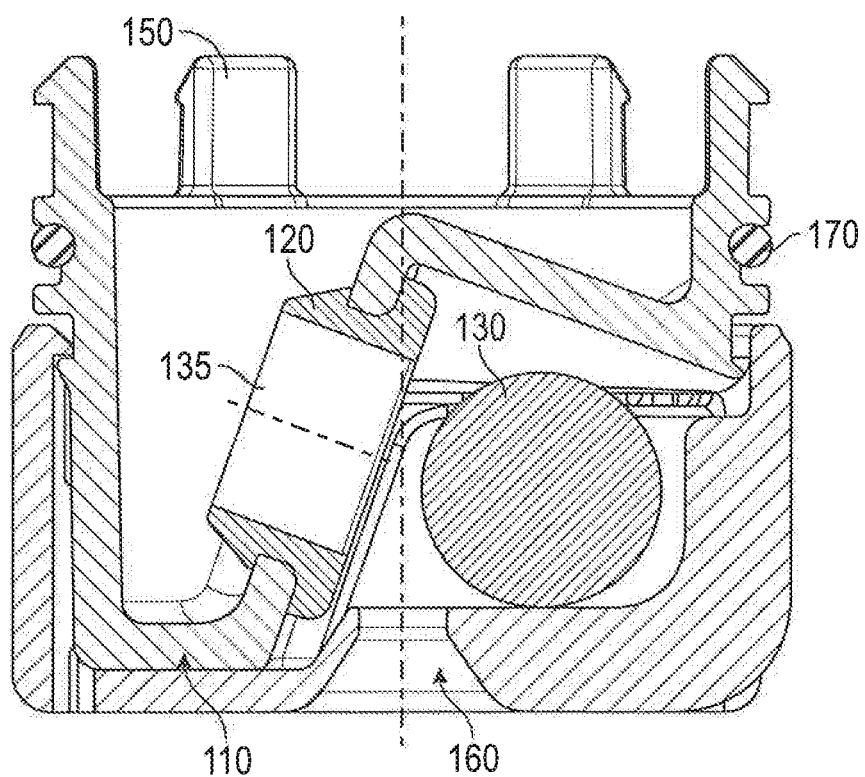
FIG. 5 is cross-section view of the flow restriction valve of FIG. 4 along line A-A.

As shown in FIG. 5, for example, the valve gasket 120 includes a passage 135. The passage 135 may be keyed to the valve ball 130 such that the valve ball may restrict fluid flow through the passage 135. The passage 135 may be configured such that the valve ball 130 completely blocks fluid flow through the passage 135 when pressed against the valve gasket 120. The passage 135 may have any appropriate geometry. The passage 135 may have a circular geometry. Alternatively, the passage 135 may have a geometry that is different than a cross section of the valve ball 130, preventing the valve ball from completely blocking the passage 135.

Figure 14:
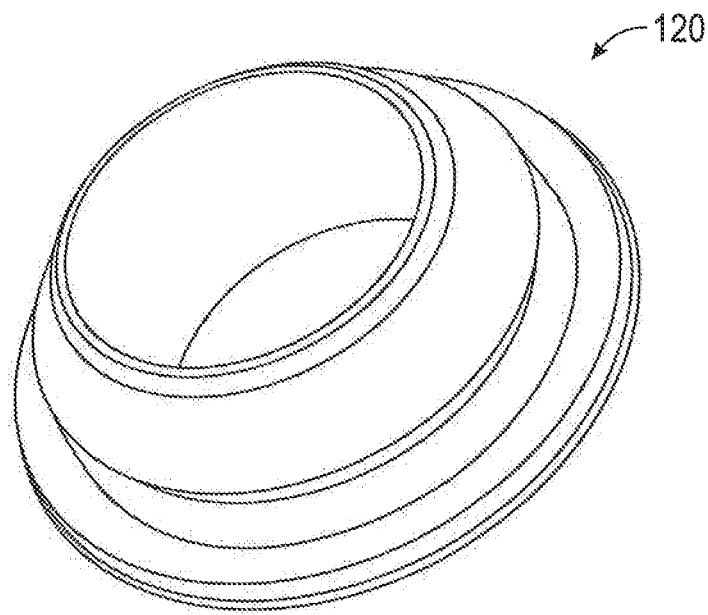
FIG. 14 is a perspective view of a flow restriction valve gasket according to one embodiment.
Figure 15:
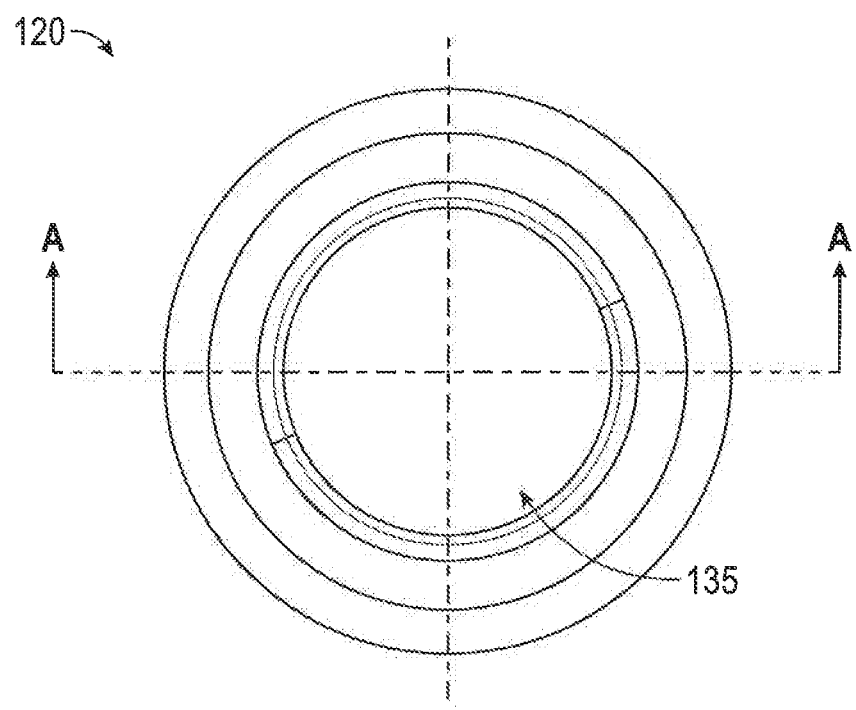
FIG. 15 is a top view of a flow restriction valve gasket according to one embodiment.
Figure 16:
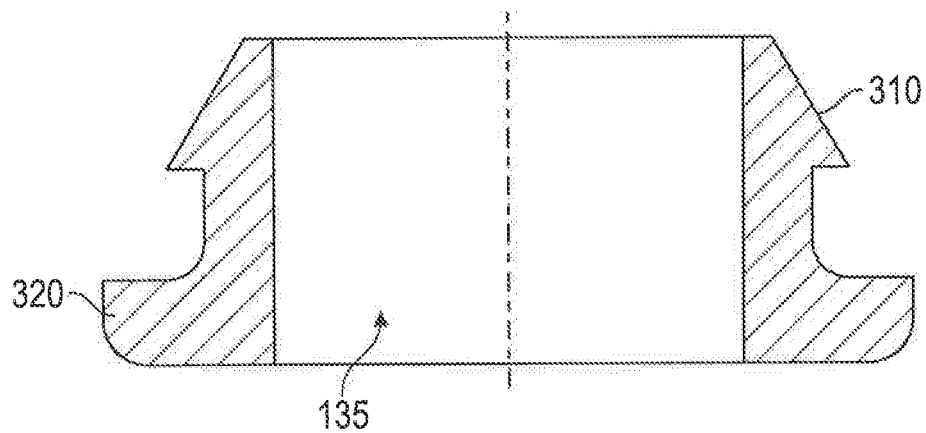
FIG. 16 is cross-section view of the flow restriction valve gasket of FIG. 15 along line A-A.
Figure 17:
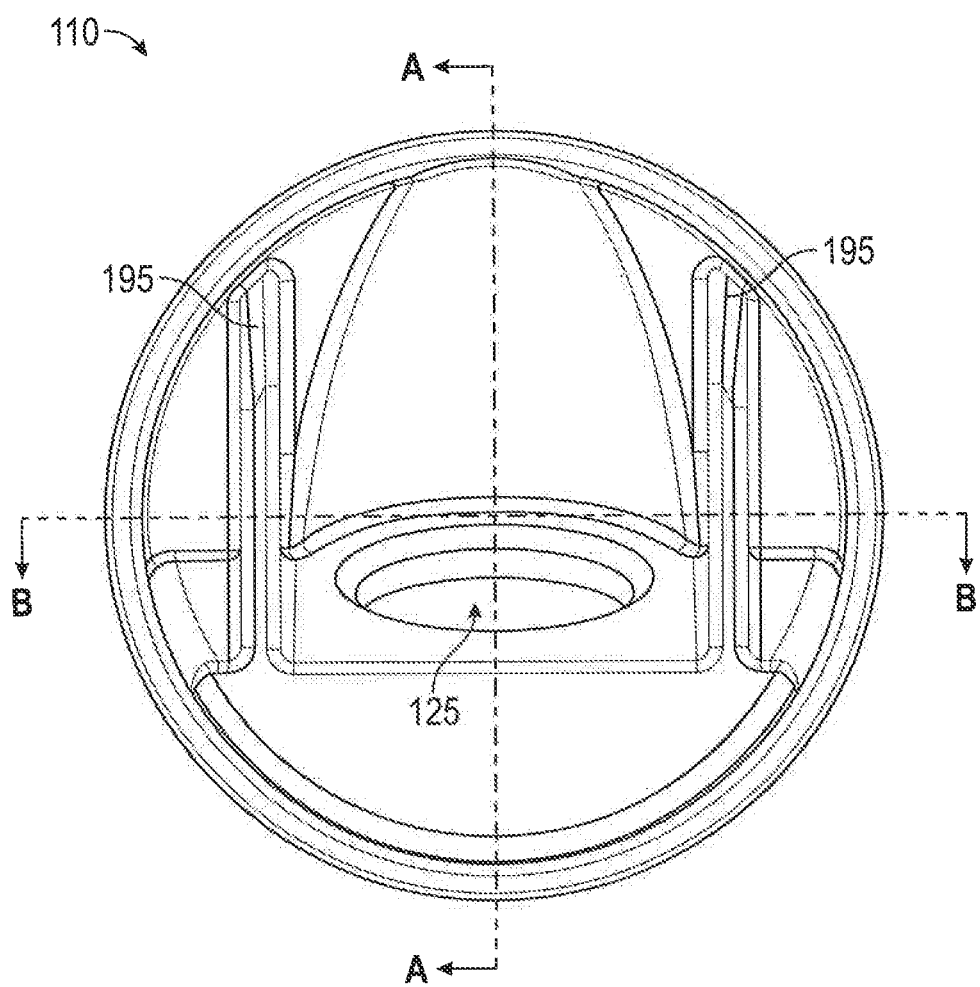
FIG. 17 is a bottom view of a flow restriction valve support according to one embodiment.

FIGS. 14-16 depict the valve gasket according to an exemplary embodiment. The valve gasket 120 may include a passage 135 that allows the flow of fluid. The passage may have any suitable geometry. The passage 135 may be a cylindrical passage extending along the central axis of the valve gasket 120. The valve gasket may include a flange 320 and a ridge 310. The flange 320 may be configured to prevent the valve gasket from passing completely through opening 125 in the valve support. The ridge 310 may be configured to secure the valve gasket 120 to the valve support 110. In one embodiment, the ridge 310 is configured to allow the ridge to be pressed through opening 125 in the valve support 110 and to engage the valve support in a snap fit connection. The valve gasket 120 may be formed from any suitable material. For example, the valve gasket may be formed from an elastic material.

According to an exemplary embodiment, the valve body 100 may include one or more fluid flow openings 140. The valve body 100 may include any appropriate number of fluid flow openings 140. In one embodiment, the valve body includes two fluid flow openings 140. The fluid flow openings may be separated by one or more ribs 190. In one embodiment, two fluid flow openings 140 are separated by a rib 190. The rib 190 may be configured to prevent the valve ball 130 from passing through or extending too far in to the fluid flow openings. In another embodiment, The rib 190 may be configured to prevent the valve ball from blocking the entirety of the fluid flow openings 140.

Figure 9:
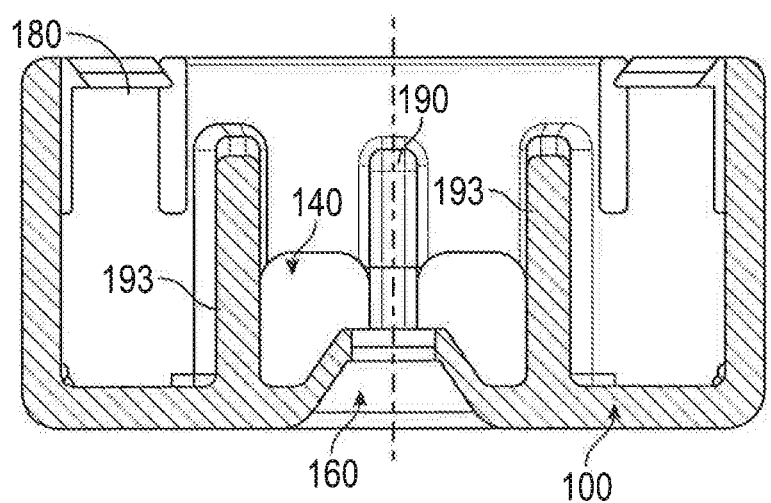
FIG. 9 is cross-section view of the flow restriction valve body of FIG. 8 along line B-B.
Figure 10:
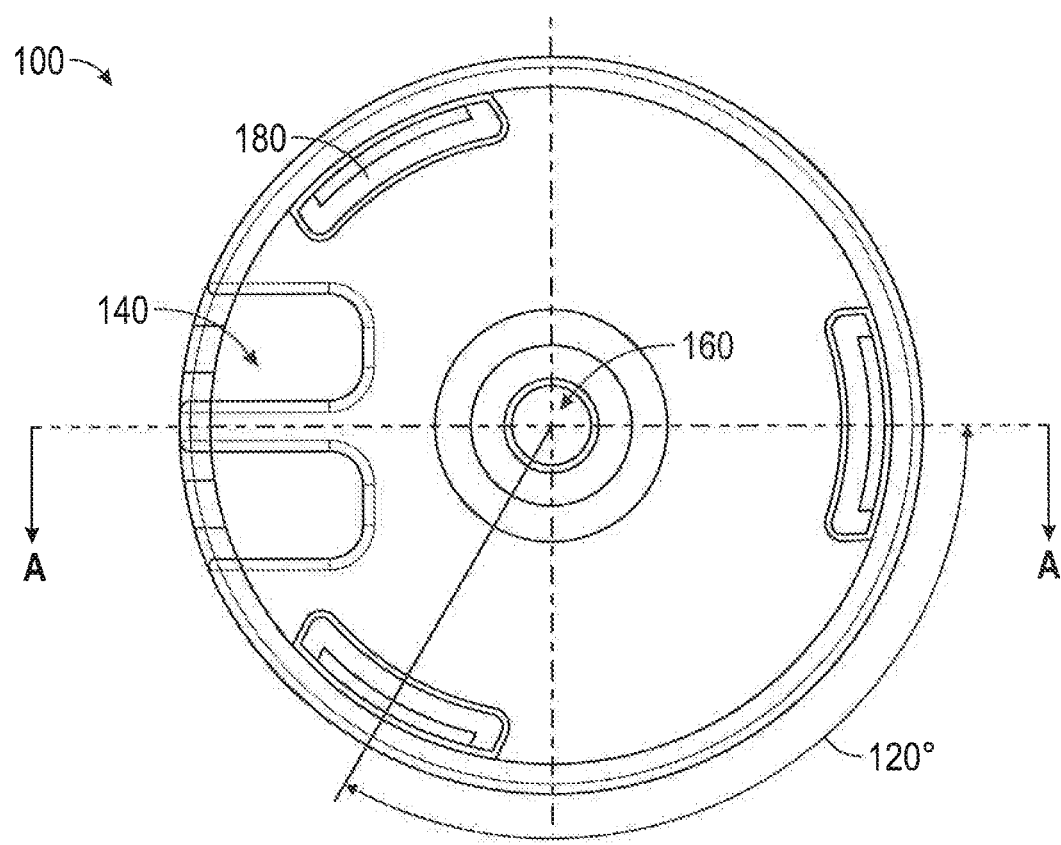
FIG. 10 is a bottom view of a flow restriction valve body according to one embodiment.

As shown in FIG. 9, for example, the valve body 100 may include a plurality of walls 193. The walls 193 may define the area of the valve body 100 in which the valve ball 130 may travel. The walls 193 may have any suitable geometry. In one embodiment, the walls 193 are parallel and extend inward from the peripheral wall of the valve body to approximately opening 160. The end of each wall 193 that is not adjacent to the peripheral wall of valve body 100 may extend at an angle oblique to the vertical axis of the valve body. In one embodiment, the angle formed by the end of the walls 193 and the vertical axis of the valve body 100 is twenty degrees.

As shown in FIG. 1, for example, the opening 140 in the valve body may have a geometry keyed to the geometrical projection 240 of the filter cartridge. The opening 140 may have a geometry configured to mate to the geometric projection 240. The opening 140 may have a conical surface. The perimeter of opening 140 may bear against the geometrical projection in a manner that creates a seal between the valve body 100 and the geometric projection 240.

Figure 18:
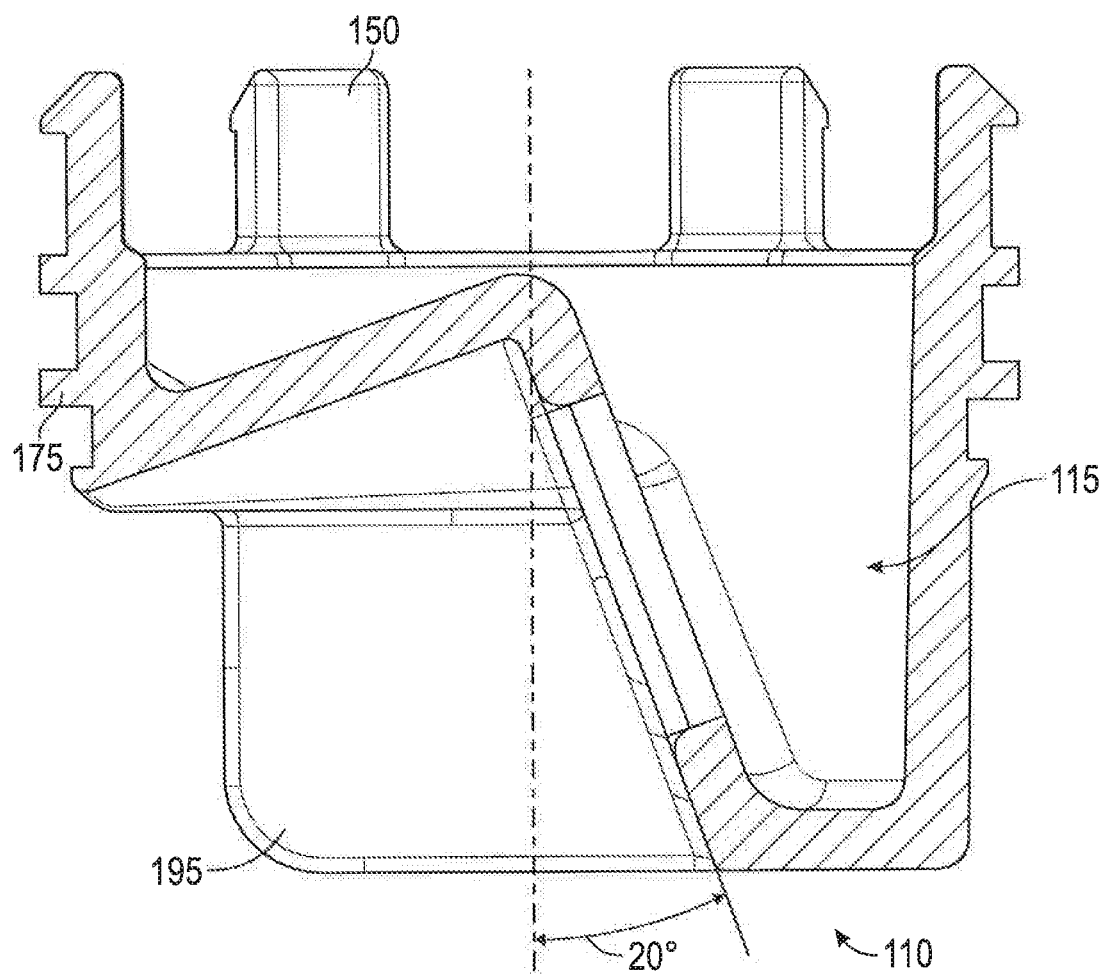
FIG. 18 is cross-section view of the flow restriction valve support of FIG. 17 along line A-A.
Figure 19:
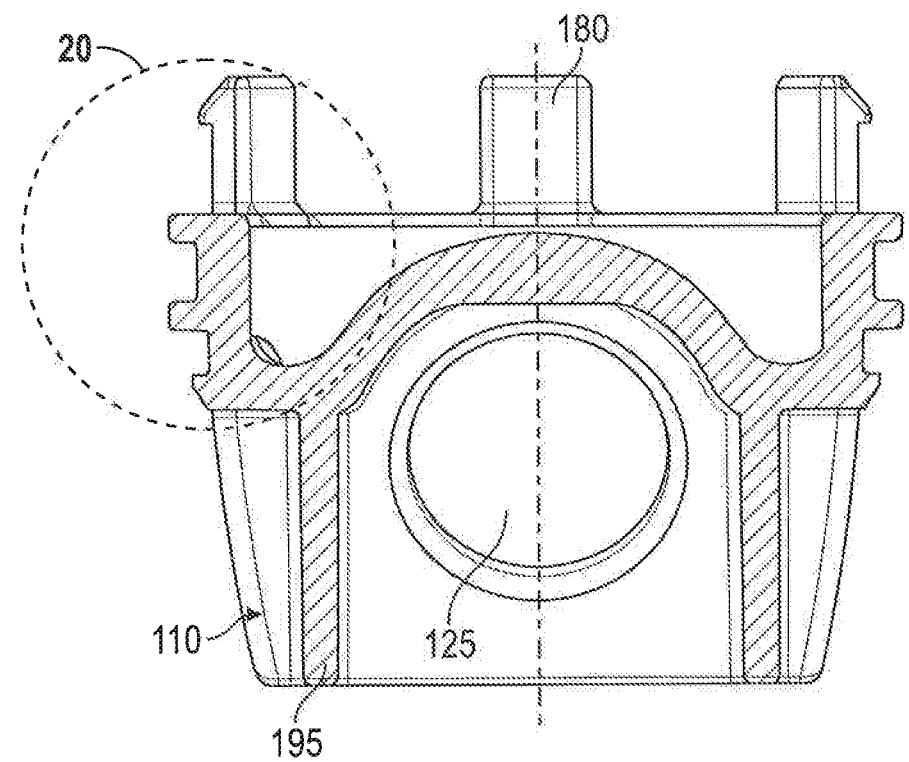
FIG. 19 is cross-section view of the flow restriction valve support of FIG. 17 along line B-B.

As shown in FIG. 19, for example, the valve support 110 may include an opening 125 and partitions 195. The partitions 195 may have any appropriate geometry. The partitions 195 extend inward from a peripheral wall of the valve support 110. The partitions 195 may be configured to delineate the area in which the valve ball may travel. The bottom surface of the valve support 110 may include a curved surface between partitions 195 above opening 125. The opening 125 may be formed in a surface of the valve support 110 that extends at an angle oblique to the longitudinal axis of the valve support. As shown in FIG. 18, for example, the surface in which opening 125 is formed may extend at an angle of twenty degrees from the longitudinal axis of the valve support 110. The valve support 110 may include a void area 115 between the peripheral wall of the valve support and the surface of the valve support in which opening 125 is formed.

Figure 2:
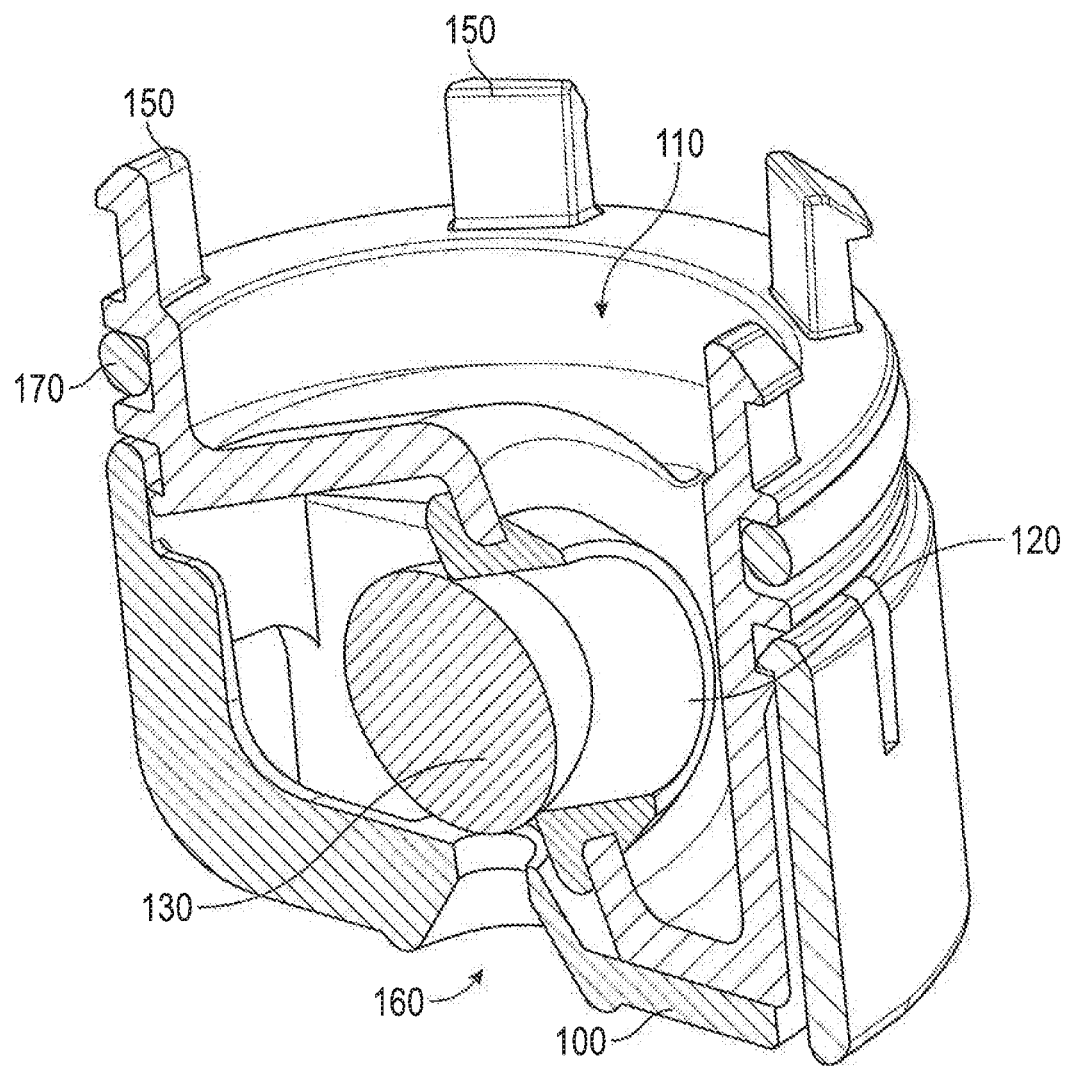
FIG. 2 is cross-section view of the flow restriction valve depicted in FIG. 1.
Figure 20:
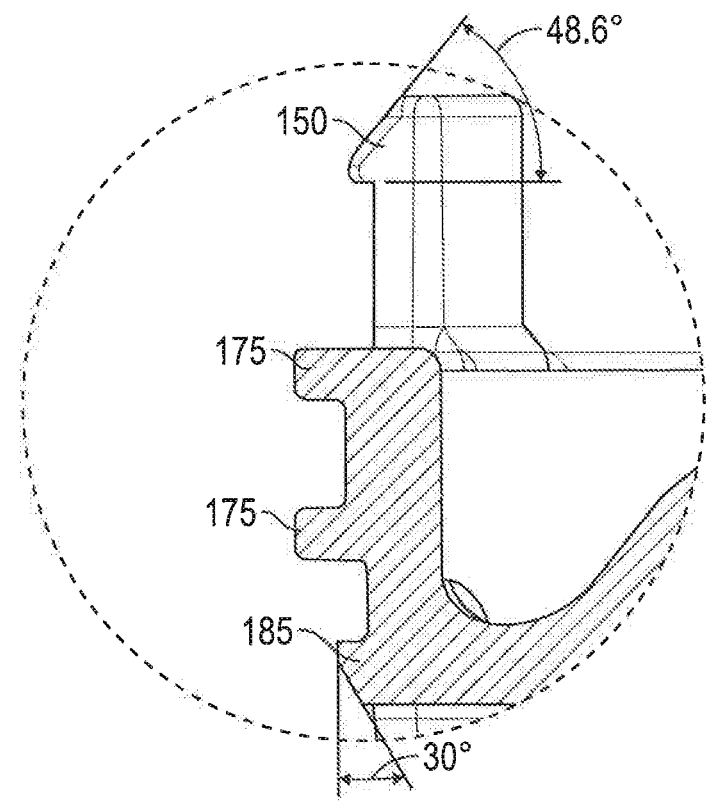
FIG. 20 is detailed view of a portion of the flow restriction valve support cross-section of FIG. 19.
Figure 21:
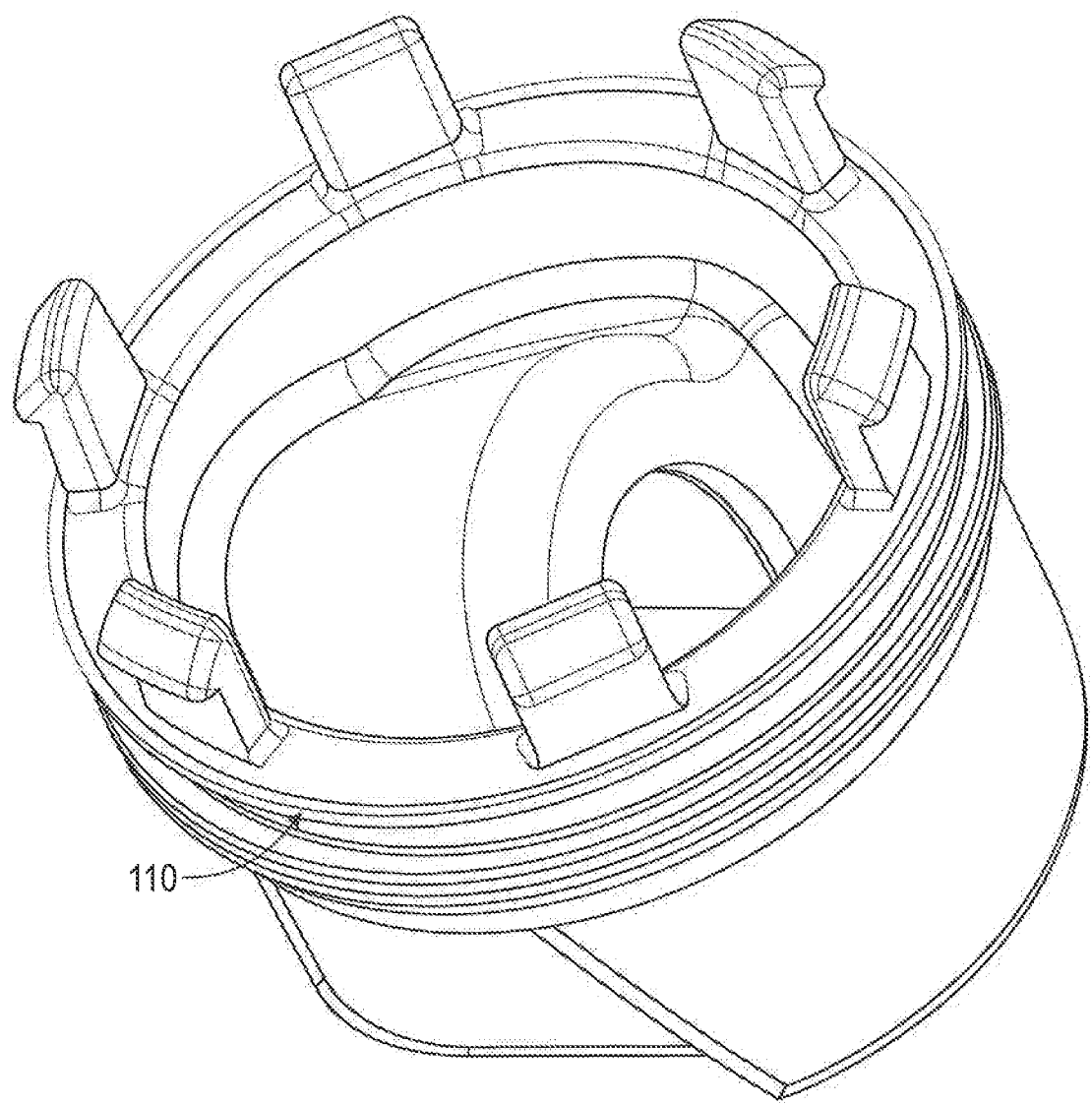
FIG. 21 is a perspective view of a flow restriction valve support according to one embodiment.

As shown in FIGS. 2, 18 and 20, the valve support 110 may include projections 175 configured to retain a sealing element 170. The projections 175 may have any appropriate geometry. For example, the projections 175 may be in the form of ribs. The ribs may extend for a distance less than the thickness of the sealing element 170 to ensure that the sealing element bears and seals against the filter housing cover 220.

As illustrated in FIGS. 2 and 20, the valve support 110 may include a projection 185 configured to accept enlarged projections 180 of valve body 100. The projection 185 may have any suitable geometry. The projection 185 may be configured to engage enlarged projections 180 of the valve body 100 in a snap fit connection.

FIGS. 22-25 illustrate an alternative embodiment. As shown in these figures, the filter system may include a filter cartridge 200 placed in a filter housing 230 that includes a filter housing cover 220. A geometric projection 240 of the filter cartridge end plate 210 may engage an opening of a flow restriction valve attached to the filter housing cover 220. The geometric projection may have any appropriate shape. In one embodiment, the geometric projection 240 is in the form of a pin.

Figure 22:
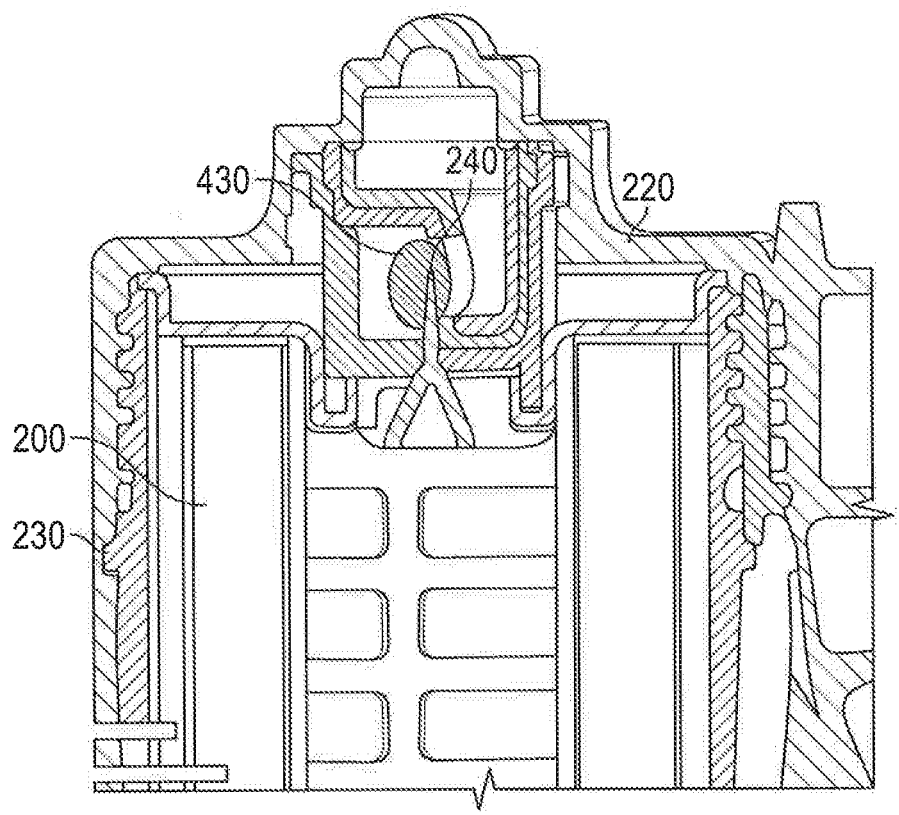
FIG. 22 is a cross-section view of a correct filter cartridge installed in a filter cartridge housing according to one embodiment.

According to an exemplary embodiment, the flow restriction valve includes valve body 400, valve support 410, valve gasket 420 and valve ball 430 that is configured to restrict fluid flow through the valve when no filter cartridge 200 or an incorrect filter cartridge is installed in the filter housing 230. The geometric projection 240 engages opening 460 of the valve such that the ball is prevented from blocking the flow of fluid when a designated filter cartridge is installed in the filter housing. FIG. 22 depicts the geometric projection 240 of a designated filter cartridge overlaid on the position of the ball 430 when restricting fluid flow through the valve, showing that the geometric projection 240 physically prevents the ball 130 from restricting fluid flow out of the filter system when a designated filter cartridge is present.

Figure 23:
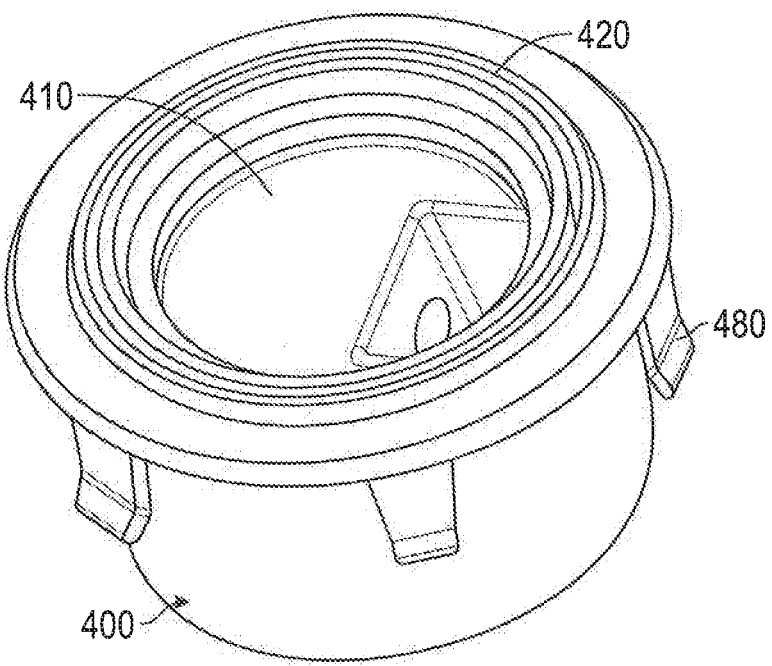
FIG. 23 is a perspective view of a flow restriction valve according to one embodiment.

As shown in FIG. 23, for example, the valve body 400 may include projections 480. The projections may engage the filter housing cover 220 to attach the flow restriction valve to the filter housing cover. The projections 480 may be configured to produce a snap fit connection of the valve body 400 to the filter housing cover 220.

Figure 25:
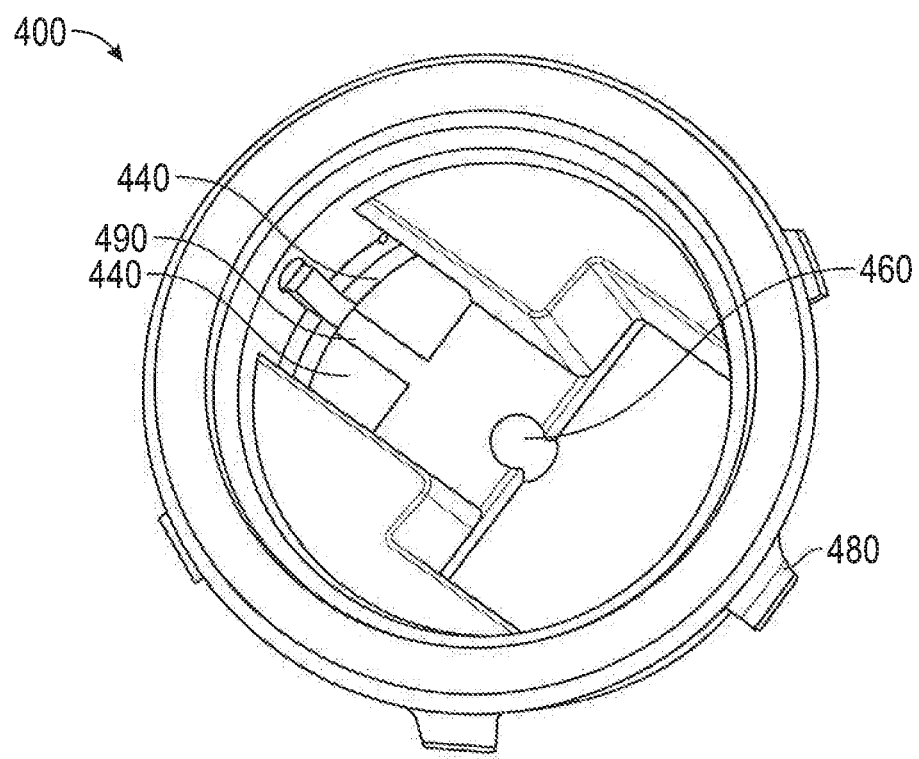
FIG. 25 is a perspective view of a flow restriction valve body according to one embodiment.

As shown in FIG. 25, the valve body 400 may include a fluid flow opening 440. The valve body 400 may contain any suitable number of fluid flow openings. The valve body 400 may include two fluid flow openings 440. The fluid flow openings may be separated by one or more ribs 490. In one embodiment, two fluid flow openings 440 are separated by a rib 490. The rib 490 may be configured to prevent the valve ball 430 from passing through or extending too far in to the fluid flow openings. In another embodiment, the rib 490 may be configured to prevent the valve ball from blocking the entirety of the fluid flow openings 440.

Figure 24:
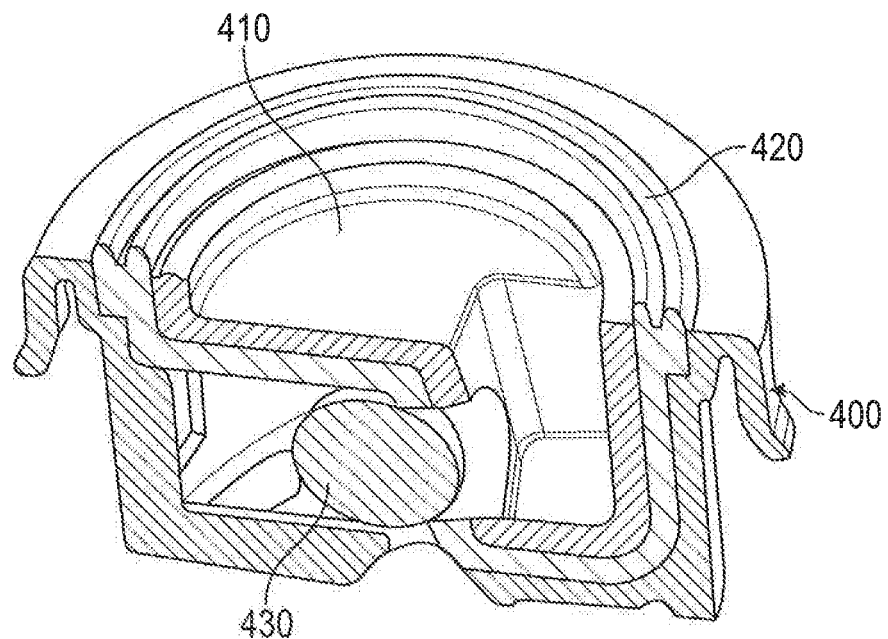
FIG. 24 is cross-section view of a flow restriction valve according to one embodiment.

As shown in FIG. 24, the valve gasket 420 may have a shape keyed to the shape of the valve support 410. The valve gasket 420 may protrude beyond the upper surface of the valve body 400 and valve support 410. The protruding portion of the valve gasket 420 may seal against the filter housing cover, producing a fluid tight seal.

According to an exemplary embodiment, the fluid filter system is a fuel filter system. In a more particular embodiment, the filter system is a diesel fuel filter system that removes contaminants from the fuel before the fuel reaches a protected system. In one embodiment the contaminant is water. The protected system may be a fuel injection pump and fuel injectors. In another embodiment, the fluid filter system may be applied to filter any suitable fluid including lubricants, hydraulic oil and air.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter system comprising:
    a designated filter cartridge including a geometric projection therein; and
    a filter cartridge housing;
    a filter cartridge housing cover; and
    a valve that controls fluid flow out of the filter system, the valve comprising:
        a valve support;
        a valve body including at least one valve body projection attaching the valve body to the valve support;
        a valve ball disposed between the valve body and the valve support;
        a passage in the valve support keyed to the valve ball such that when a fluid pressure forces the valve ball against the passage, fluid flow through the passage is restricted; and
    wherein the valve comprises an opening keyed to the geometric projection such that the geometric projection engages the opening and actuates the valve by preventing the valve ball from contacting the passage.

2. A filter system comprising:
    a designated filter cartridge including a geometric projection therein; and
    a filter cartridge housing;
    a filter cartridge housing cover; and
    a valve that controls fluid flow out of the filter system, the valve comprising:
        a valve support;
        a valve body including at least one valve body projection attaching the valve body to the valve support; and
        a valve ball disposed between the valve body and the valve support;
    wherein the valve comprises an opening keyed to the geometric projection such that the geometric projection engages the opening and actuates the valve, wherein the valve support comprises a plurality of valve support projections each having an enlarged end, each enlarged end fitting over a corresponding feature of the filter cartridge housing cover, thereby attaching the valve support to the filter housing cover.

3. The filter system of claim 1, wherein the at least one valve body projection comprises a plurality of valve body projections, each of the plurality of valve body projections fitting over a corresponding feature of the valve support.

4. A filter system comprising:
    a designated filter cartridge including a geometric projection therein; and
    a filter cartridge housing;
    a filter cartridge housing cover; and
    a valve that controls fluid flow out of the filter system, the valve comprising:
        a valve support;
        a valve body including at least one valve body projection attaching the valve body to the valve support; and
        a valve ball disposed between the valve body and the valve support;
    wherein the valve comprises an opening keyed to the geometric projection such that the geometric projection engages the opening and actuates the valve, wherein the valve body includes at least one bypass opening, the at least one bypass opening permitting fluid to pass through the valve when no filter cartridge or an incorrect filter cartridge is installed.

5. The filter system of claim 4, wherein the at least one bypass opening comprises three bypass openings evenly spaced around a perimeter of the valve body.

6. The filter system of claim 1, wherein the valve further comprises a valve gasket, the valve gasket including the passage keyed to the valve ball.

7. A filter system comprising:
    a designated filter cartridge including a geometric projection therein; and
    a filter cartridge housing;
    a filter cartridge housing cover; and
    a valve that controls fluid flow out of the filter system, the valve comprising:
        a valve support;
        a valve body including at least one valve body projection attaching the valve body to the valve support; and
        a valve ball disposed between the valve body and the valve support;
    wherein the valve comprises an opening keyed to the geometric projection such that the geometric projection engages the opening and actuates the valve, wherein the valve further comprises a valve gasket, the valve gasket comprising a flange preventing the valve gasket from passing completely through a valve support opening in the valve support.

8. The filter system of claim 7, wherein the valve gasket further comprising a ridge securing the valve gasket to the valve support.

9. The filter system of claim 8, wherein the ridge engages the valve support in a snap fit connection.

10. A filter system comprising:
    a designated filter cartridge including a geometric projection therein; and
    a filter cartridge housing;
    a filter cartridge housing cover; and
    a valve that controls fluid flow out of the filter system, the valve comprising:
        a valve support;

a valve body including at least one valve body projection attaching the valve body to the valve support; and a valve ball disposed between the valve body and the valve support;

wherein the valve comprises an opening keyed to the geometric projection such that the geometric projection engages the opening and actuates the valve, wherein the valve body includes a plurality of fluid flow openings separated from each other by at least one rib, the at least one rib configured so as to prevent the valve ball from passing through a respective fluid flow opening.

11. The filter system of claim 1, wherein a valve support opening in the valve support is formed in a surface of the valve support that extends at an angle oblique to a longitudinal axis of the valve support.

12. The filter system of claim 11, wherein the valve support may include a void area between a peripheral wall of the valve support and the surface of the valve support in which the valve support opening is formed.

13. A filter system comprising:
a designated filter cartridge including a geometric projection therein; and
a filter cartridge housing;
a filter cartridge housing cover; and
a valve that controls fluid flow out of the filter system, the valve comprising:
a valve support;
a valve body including at least one valve body projection attaching the valve body to the valve support; and
a valve ball disposed between the valve body and the valve support;
wherein the valve comprises an opening keyed to the geometric projection such that the geometric projection engages the opening and actuates the valve, further comprising a sealing element engaging an outer surface of the valve support, the sealing element providing a fluid seal between the valve support and the filter housing cover.

14. A filter system comprising:
a filter cartridge housing;
a filter cartridge housing cover coupled to the filter cartridge housing; and
a valve that controls fluid flow out of the filter system, the valve comprising:
a valve support including at least one valve support projection attaching the valve support to the filter housing cover;
a valve body including at least one valve body projection attaching the valve body to the valve support;
a valve ball disposed between the valve body and the valve support;
a passage in the valve support keyed to the valve ball such that when a fluid pressure forces the valve ball against the passage, fluid flow through the passage is restricted;
wherein the valve comprises an opening keyed to a geometric projection of a designated filter cartridge such that when the designated filter cartridge is installed in the filter cartridge housing assembly, the geometric projection engages the opening and actuates the valve by preventing the valve ball from contacting the passage.

15. A filter system comprising:
a filter cartridge housing;
a filter cartridge housing cover coupled to the filter cartridge housing; and
a valve that controls fluid flow out of the filter system, the valve comprising:
a valve support including at least one valve support projection attaching the valve support to the filter housing cover;
a valve body including at least one valve body projection attaching the valve body to the valve support; and
a valve ball disposed between the valve body and the valve support;
wherein the valve comprises an opening keyed to a geometric projection of a designated filter cartridge such that, when the designated filter cartridge is installed in the filter cartridge housing assembly, the geometric projection engages the opening and actuates the valve, wherein the at least one valve support projection comprises a plurality of valve support projections each having an enlarged end, each enlarged end fitting over a corresponding feature of the filter cartridge housing cover.

16. The filter system housing assembly of claim 14, wherein the at least one valve body projection comprises a plurality of valve body projections, each of the plurality of valve body projections fitting over a corresponding feature of the valve support.

17. A filter system comprising:
a filter cartridge housing;
a filter cartridge housing cover coupled to the filter cartridge housing; and
a valve that controls fluid flow out of the filter system, the valve comprising:
a valve support including at least one valve support projection attaching the valve support to the filter housing cover;
a valve body including at least one valve body projection attaching the valve body to the valve support; and
a valve ball disposed between the valve body and the valve support;
wherein the valve comprises an opening keyed to a geometric projection of a designated filter cartridge such that, when the designated filter cartridge is installed in the filter cartridge housing assembly, the geometric projection engages the opening and actuates the valve, wherein the valve body includes at least one bypass opening, the at least one bypass opening permitting fluid to pass through the valve when no filter cartridge or an incorrect filter cartridge is installed.

18. A filter system comprising:
a filter cartridge housing;
a filter cartridge housing cover coupled to the filter cartridge housing; and
a valve that controls fluid flow out of the filter system, the valve comprising:
a valve support including at least one valve support projection attaching the valve support to the filter housing cover;
a valve body including at least one valve body projection attaching the valve body to the valve support; and
a valve ball disposed between the valve body and the valve support;
wherein the valve comprises an opening keyed to a geometric projection of a designated filter cartridge such that, when the designated filter cartridge is installed in the filter cartridge housing assembly, the geometric projection engages the opening and actuates the valve, wherein the valve body includes a plurality of fluid flow openings separated from each other by at least one rib, the at least one rib configured so as to prevent the valve ball from passing through a respective fluid flow opening.

19. An installation method for a filter system, comprising:
providing a designated filter cartridge, the designated filter cartridge comprising:
  an end plate;
  a geometric projection extending from the end plate; and
  a filter media;
installing the designated filter cartridge within a filter cartridge housing assembly, the filter cartridge housing assembly comprising:
  a filter cartridge housing;
  a filter cartridge housing cover coupled to the filter cartridge housing; and
  a valve that controls fluid flow out of the filter system, the valve comprising:
    a valve support including at least one valve support projection attaching the valve support to the filter housing cover;
    a valve body including at least one valve body projection attaching the valve body to the valve support;
    a valve ball disposed between the valve body and the valve support;
    a passage in the valve support keyed to the valve ball such that when a fluid pressure forces the valve ball against the passage, fluid flow through the passage is restricted; and
  via the installation of the designated filter cartridge within the filter cartridge housing assembly, engaging the geometric projection of the designated filter cartridge with an opening in the valve that is keyed to the geometric projection of the geometric projection of the designated filter cartridge, thereby actuating the valve by preventing the valve ball from contacting the passage.

20. The installation method of claim 19, wherein the opening in the valve is formed within the valve body.

* * * * *